(12) United States Patent
Warner et al.

(10) Patent No.: US 10,955,118 B2
(45) Date of Patent: Mar. 23, 2021

(54) LIGHT FIXTURE INSTALLATION APPARATUS AND METHODS

(71) Applicant: ABL IP Holding LLC, Atlanta, GA (US)

(72) Inventors: Benjamin J. Warner, McCordsville, IN (US); Brandon S. Mundell, Indianapolis, IN (US)

(73) Assignee: ABL IP Holding LLC, Atlanta, GA (US)

( * ) Notice: Subject to any disclaimer, the term of this patent is extended or adjusted under 35 U.S.C. 154(b) by 202 days.

(21) Appl. No.: 16/184,324

(22) Filed: Nov. 8, 2018

(65) Prior Publication Data

US 2020/0149718 A1    May 14, 2020

(51) Int. Cl.
*F21V 21/04* (2006.01)
*B21D 22/02* (2006.01)
*F16M 13/02* (2006.01)

(52) U.S. Cl.
CPC ............ *F21V 21/049* (2013.01); *B21D 22/02* (2013.01); *F16M 13/02* (2013.01)

(58) Field of Classification Search
CPC ........ B21D 22/02; B21D 19/00; B21D 53/36; B21D 5/16; F21V 21/049; F21V 21/04; F21V 21/042; F21V 21/044; F21V 21/30; F21S 8/02; F21S 8/026
See application file for complete search history.

(56) References Cited

U.S. PATENT DOCUMENTS

| 8,182,116 | B2 | 5/2012 | Zhang et al. |
| 8,474,774 | B2 | 7/2013 | Svensson |
| 9,857,038 | B2 | 1/2018 | Coakley et al. |
| 10,371,329 | B2 * | 8/2019 | Coakley ................. F21V 29/503 |
| 10,406,674 | B2 * | 9/2019 | Humphreys ............ F21S 8/026 |
| 2015/0085499 | A1 | 3/2015 | Mandy et al. |
| 2017/0009964 | A1 | 1/2017 | Chancey |

OTHER PUBLICATIONS

U.S. Appl. No. 16/184,225, "Notice of Allowance", dated Mar. 25, 2020, 5 pages.
U.S. Appl. No. 16/184,225, "Non-Final Office Action," dated Oct. 24, 2019, 9 pages.

* cited by examiner

*Primary Examiner* — Peggy A Neils
(74) *Attorney, Agent, or Firm* — Kilpatrick Townsend & Stockton LLP

(57) ABSTRACT

A foldable mounting collar includes first and second collar segments. Each collar segment includes a planar annular segment that substantially subtends a semicircle, a collar flange that, when the planar annular segment is horizontal, extends vertically downward along an inner periphery of the planar annular segment, such that the collar flange forms a cylindrical portion, and two hinge flanges that, when the planar annular segment is horizontal, extend upwardly from each end of the semicircle formed by each planar annular segment. The mounting collar further includes pivot means that hingedly couple pairs of the hinge flanges of the collar segments. The second collar segment can rotate, relative to the first collar segment, through at least a polar angle range sufficient for the mounting collar to fit through an aperture having a diameter defined by the cylindrical portions of the collar flanges when both collar segments are horizontal.

25 Claims, 11 Drawing Sheets

US 10,955,118 B2

LIGHT FIXTURE INSTALLATION APPARATUS AND METHODS

FIELD OF THE INVENTION

Embodiments herein relate to apparatus used to install light fixtures within walls or ceilings, such as recessed light fixtures with most hardware hidden behind the wall or ceiling, and minimal hardware visible from an adjoining room space.

BACKGROUND

Certain light fixtures provide light within an illuminated space by projecting the light through an aperture formed in a wall or ceiling. For example, recessed "can" type fixtures have long been in use. These fixtures typically use an incandescent bulb, are mounted within ceiling aperture in a cylindrical housing with an open end, to emit light downwardly through the open end and the aperture, into the illuminated space. Known issues connected with these fixtures include relatively low efficiency/high heat production, and relatively large size connected with the size of typical Edison base bulbs and their corresponding sockets. Compact fluorescent bulbs (CFLs) can be used in these fixtures to improve efficiency, but the fixtures themselves are still sized according to the size of their Edison base, incandescent bulb predecessors.

Recent advances in light-emitting diode (LED) technology have opened up opportunities to retrofit existing installations, and provide new installations, with fixtures that are based on compact and energy efficient light engines. Advanced mechanical apparatus and methods such as those described below can be used to facilitate installation and minimize height of such fixtures.

SUMMARY

Embodiments of the present invention relate to apparatus that can be used to install certain light fixtures within a wall or ceiling aperture.

In an embodiment, a retention assembly for a light fixture that includes a light fixture housing is disclosed. The retention assembly includes a body that is configured to couple with the light fixture housing through a hinge. The body forms an internal axle. The retention assembly also includes a spring. A proximal end of the spring coils about the internal axle, and a distal end of the spring extends from the body, and is configured to couple with a coupling feature of the light fixture housing. When the body couples with the hinge and the distal end of the spring couples with the coupling feature of the light fixture housing, a tension within the spring exerts a torque on the body, so as to urge the body to rotate about the hinge, toward the coupling feature.

In an embodiment, a light fixture includes a light fixture housing that includes (a) two coupling features, and (b) two retention assemblies. Each retention assembly is associated with, and operatively couples with the light fixture housing through, a respective hinge. Each retention assembly includes a body and a spring. The body forms an internal axle. A proximal end of the spring coils about the internal axle, and a distal end of the spring extends from the body, and is configured to couple with a respective one of the coupling features. When the distal end of the spring couples with the respective one of the coupling features, a tension within the spring exerts a torque on the body, so as to urge the body to rotate about the hinge, toward the respective one of the coupling features.

In an embodiment, a method of installing a light fixture includes forming an aperture in a mounting surface, and exerting a first torque on retention assemblies that are hingedly coupled with the light fixture, so that the retention assemblies rotate upward until distal tips of the retention assemblies fit within the aperture. The method further includes inserting the distal tips of the retention assemblies through the aperture, and releasing the first torque. The retention assemblies rotate downward, due to an opposing torque exerted by a spring that couples with the retention assemblies and the light fixture, so that the retention assemblies pull the light fixture into the aperture.

In an embodiment, a foldable mounting collar includes first and second collar segments. Each collar segment includes a planar annular segment that substantially subtends a semicircle, a collar flange that, when the planar annular segment is horizontal, extends vertically downward along an inner periphery of the planar annular segment, such that the collar flange forms a cylindrical portion, and two hinge flanges that, when the planar annular segment is horizontal, extend upwardly from each end of the semicircle formed by each planar annular segment. The foldable mounting collar further includes pivot means that hingedly couple opposing pairs of the hinge flanges of the first and second collar segments. The second collar segment can rotate, relative to the first collar segment, through at least a polar angle range sufficient for the foldable mounting collar to fit through an aperture having a diameter defined by the cylindrical portions of the collar flanges when both collar segments are horizontal.

In an embodiment, a method forms a foldable mounting collar. The method includes providing first and second collar segments. Each collar segment includes a planar annular segment that substantially subtends a semicircle, and a collar flange that, when the planar annular segment is horizontal, extends vertically downward along an inner periphery of the planar annular segment, such that the collar flange forms a cylindrical portion. The method further includes pivotably coupling the first and second collar segments, such that the second collar segment can rotate, relative to the first collar segment, through at least a polar angle range sufficient for the foldable mounting collar to fit through an aperture having a diameter defined by the cylindrical portions of the collar flanges when both annular segments are horizontal.

In an embodiment, a method of installing a foldable mounting collar includes (a) folding first and second collar segments of the foldable mounting collar together to minimize size of the foldable mounting collar, (b) inserting the foldable mounting collar through an aperture formed in a mounting surface, (c) unfolding the first and second collar segments, and (d) seating the first and second collar segments with respect to the aperture. An annular segment of each of the first and second collar segments is disposed adjacent to a distal planar surface of the mounting surface, and a collar flange of each of the first and second collar segments is disposed adjacent to an inner edge of the aperture.

BRIEF DESCRIPTION OF THE DRAWINGS

Embodiments are described in detail below with reference to the following figures, in which like numerals within the drawings and mentioned herein represent substantially identical structural elements.

DETAILED DESCRIPTION

Embodiments herein relate to apparatus used to install light fixtures within walls or ceilings, such as recessed light fixtures in which most hardware is desirably hidden behind the wall or ceiling, with minimal hardware visible from an adjoining room space. Some embodiments relate to retention assemblies for positioning a light fixture within an aperture in a wall or ceiling. Certain other embodiments relate to a foldable mounting collar used in connection with the aperture. Still other embodiments relate to methods of installing light fixtures using the retention assemblies and/or the foldable mounting collar. Yet other embodiments relate to methods of fabricating the retention assemblies and/or the foldable mounting collar. While the retention assemblies and/or the foldable mounting collar disclosed herein can be used together in an installation, they can also be used independently of one another.

Figure 1:
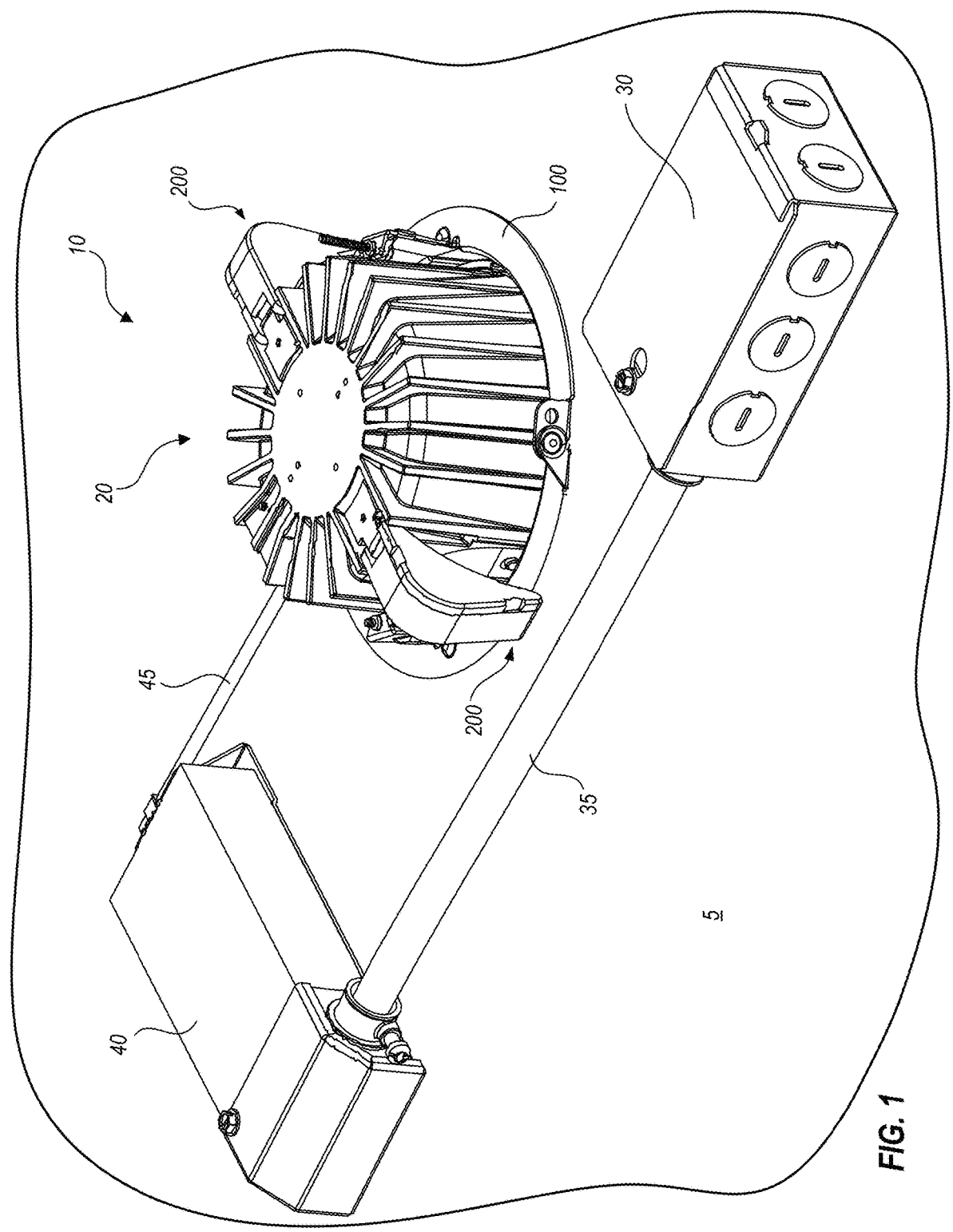
FIG. 1 is a schematic perspective view, as seen from above, of a light fixture installation that includes a foldable mounting collar, and a light fixture that includes and is installed with two retention assemblies, in accord with one or more embodiments.

FIG. 1 is a schematic perspective view, as seen from above, of a light fixture installation 10 that includes a foldable mounting collar 100, and a light fixture 20 that includes, and is installed with, two retention assemblies 200. Installation 10 positions light fixture 20 within an aperture of a ceiling 5, such that a light source within light fixture 20 emits light downwardly through the aperture into an illuminated area below. It is to be understood that the aperture could be formed in a wall surface instead of a ceiling surface, and that the teachings herein would easily be modified for wall mounting applications. The term "ceiling" will thus be used for simplicity herein without restricting applicability of this disclosure from use with mounting surfaces other than ceilings.

Power for light fixture 20 is obtained from a junction box 30 that provides line voltage (e.g., nominal 110V/115V/120V/277V/347V AC mains power) through a conduit 35 to a driver box 40 where the power is downconverted to low voltage power (e.g., 60V or less DC power). Electrical codes may require voltages such as those found in the mains power to be shielded within a conduit such as conduit 35, but the low voltage power can usually be connected with small gauge wiring 45, that may be connectorized for convenience. Foldable mounting collar 100 is disposed atop ceiling 5 and partially within the aperture therein so as to protect a cut edge of ceiling 5. Two retention assemblies 200 suspend light fixture 20 within the aperture formed in ceiling 5, as described further below in FIGS. 5-10. One portion of each retention assembly 200 couples with light fixture 20, and another portion rests on a surface that bears the weight of light fixture 20, such as a surface of ceiling 5, foldable mounting collar 100, or other hardware such as a mounting pan that can transfer the weight of light fixture 20 to ceiling 5 (e.g., see FIG. 9).

Figure 2A:
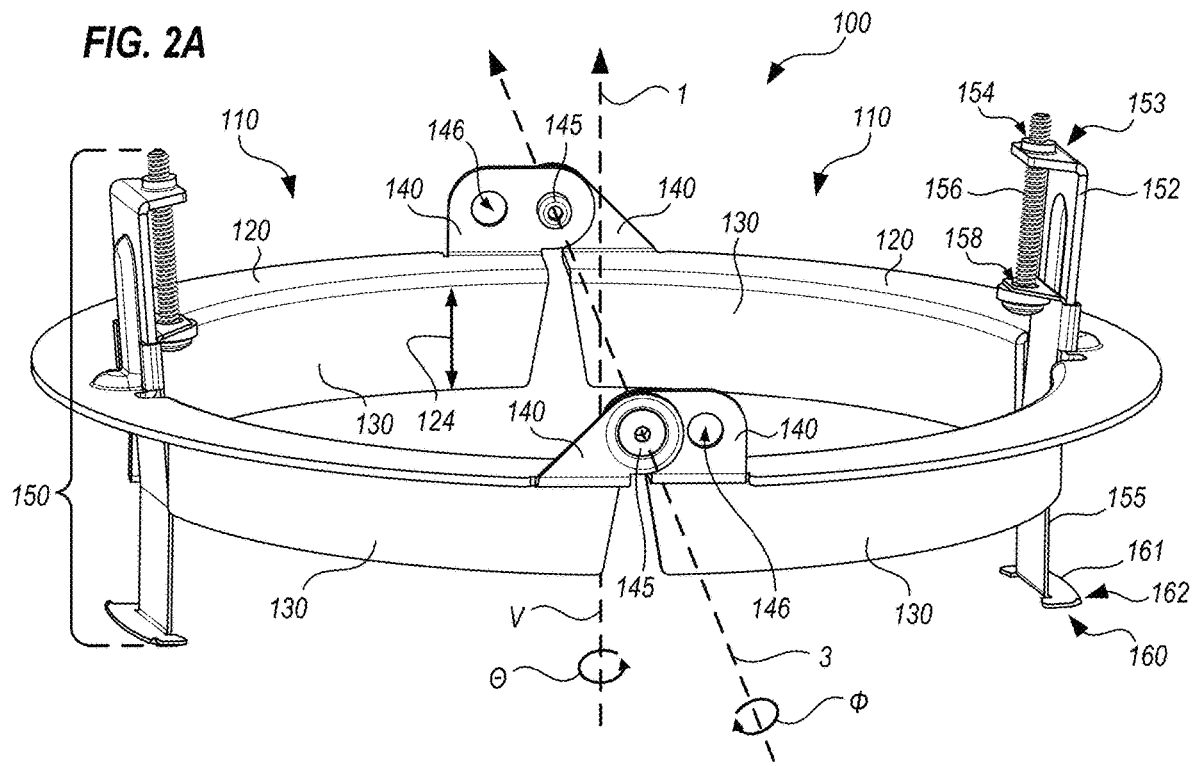
FIG. 2A is a schematic perspective view, as seen from above, that illustrates exemplary features of the foldable mounting collar of FIG. 1, in accord with one or more embodiments.
Figure 2B:
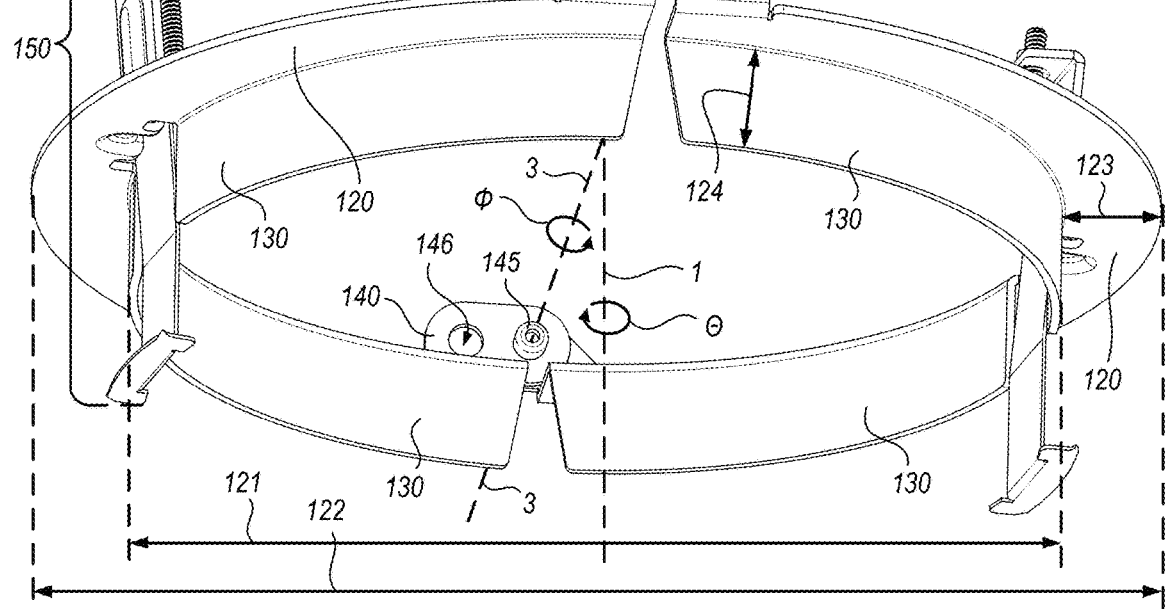
FIG. 2B is a schematic perspective view, as seen from below, that illustrates exemplary features of the foldable mounting collar of FIG. 1, in accord with one or more embodiments.

FIG. 2A is a schematic perspective view, as seen from above, that illustrates exemplary features of foldable mounting collar 100. FIG. 2B is a schematic perspective view, as seen from below, that illustrates exemplary features of foldable mounting collar 100. FIG. 2A includes a reference diagram that illustrates the intended meanings of a vertical direction V along a central axis 1, an azimuthal angular direction θ rotating about central axis 1, and a polar angular direction ϕ rotating about an axis 3 that is defined by pivot means 145, as discussed below. Herein, terms such as "up," "down," "upper," "lower," "above," and "below" are used to provide reference frame to describe features of mounting collar 100 in connection with an intended use in a ceiling installation, but these terms do not limit use of mounting collar 100 to ceiling installations, or in the orientation shown. Similarly, the term "proximal" is used to describe features or movements toward an installer who is presumed to be below a ceiling where mounting collar 100 is installed, and "distal" is used to describe features or movements away from such installer.

Mounting collar 100 includes first and second collar segments 110; in the embodiment shown collar segments 110 are substantially identical to one another (e.g., one collar segment 110 is positioned with an azimuthal rotation of 180° relative to the other) but other embodiments may include collar segments that are not necessarily identical. Each collar segment 110 includes a substantially planar annular segment 120 that is configured to lie generally flat on an upward facing surface of a ceiling material that surrounds an aperture (e.g., material of ceiling 5 surrounding aperture 8, see FIG. 3). Each annular segment 120 subtends an azimuthal arc of at least 160°; in FIGS. 2A and 2B, annular segments 120 subtend arcs of about 178°. Each annular segment 120 defines an inner diameter 121 and an outer diameter 122, thus, a width 123 of each annular segment 120 is an annular radius defined by a difference between inner diameter 121 and outer diameter 122. In embodiments, width 123 is typically 0.25 inch to 1.00 inch, but may be larger or smaller. When mounting collar 100 is intended for an aperture 8 that is 5 inches in diameter, width 123 may be 0.4 inch to 0.6 inch. One or more collar flange sections 130 extend downwardly from an inner periphery of each annular segment 120, so that collar flange sections 130 form generally cylindrical portions. Collar flange sections 130 typically form a height 124 of 0.25 inch to 1.00 inch along the vertical direction, but may be shorter or taller. When mounting collar 100 is intended for an aperture 8 that is 5 inches in diameter, height 124 may be 0.4 inch to 0.7 inch. Collar flange sections 130 and annular segments 120, together, are configured to cover an upper edge of a circular aperture (e.g., aperture 8, FIG. 1). This enables foldable mounting collar 100 to substantially protect cut edges of aperture 8 which may be formed, for example, in mounting surfaces such as ceiling tile or drywall. Without protection, such surfaces can often be damaged through contact with objects such as light fixtures, junction boxes, installation tools and the like; foldable mounting collar 100 can prevent some such damage.

Each collar segment 110 includes two hinge flanges 140 that extend upwardly from each end of annular segment 120. Hinge flanges 140 are joined by pivot means 145 so that annular segments 120 can be folded together for installation within an aperture, as discussed further below. Hinge flanges 140 are illustrated as adjoining annular segments 120 at radially outer edges of annular segments 120, but could also be formed at a radially inner or intermediate location with respect to width 123 of annular segments 120. In the embodiment illustrated, locating hinge flanges 140 at radially outer edges of annular segments 120 allows each collar segment 110 to be formed from a single piece of sheet metal, while allowing collar flanges to extend as far towards ends of collar segments 110 as possible. That is, when the single piece of sheet metal is first cut to provide metal for all of the features of each collar segment 110, hinge flanges 140 use portions of the sheet metal that are radially outward of annular segments 120, while collar flange sections 130 use portions of the sheet metal that are radially inward of annular segments 120 at the same azimuthal locations as hinge flanges 140.

Pivot means 145 can be any hardware that allows hinge flanges 140 to be hingedly coupled, such as an axle, a blind rivet or other rivet, a post, a dowel, a pin, a screw, a circular track, a bearing race, a ball and socket joint, or any other suitable hardware that allows rotation. One of ordinary skill in the art will readily conceive of many alternatives, equivalents and modifications.

Axis 3, about which polar angles ϕ are defined, extends through both pivot means 145. If either pivot means 145 permits rotation along more than a single degree of freedom (e.g., if a ball and socket joint is used, or if a pivot means 145 is constructed so as to allow wobble about a rotational direction) then axis 3 is defined by a line that passes through both pivot means 145. When polar angle ϕ is zero, collar segments 110 extend directly outward from each other such that annular segments 120 are in the same plane; positive polar angles correspond to the upward surfaces of annular segments 120 approaching one another face to face, and negative polar angles correspond to the downward surfaces of annular segments 120 approaching one another face to face. When a first one of collar segments 110 is oriented horizontally, the hinged connection between collar segments 110 allows the second collar segment 110 to rotate at least through a polar angle range of positive 60° through −5°, for reasons discussed further below. In certain embodiments, second collar segment 110 can rotate through polar angle ranges of up to positive 135° through −15°, or positive 160° through −20°, to facilitate installation as discussed further below. Moving the second collar segment 110 toward a positive polar angle relative to the first collar segment 110 is sometimes called "folding" mounting collar 100 herein, while moving the second collar segment 110 toward a negative polar angle relative to the first collar segment 110 is called "unfolding" mounting collar 100.

Each hinge flange 140 optionally forms an additional aperture 146 that can be used, for example, to couple foldable mounting collar 100 with an adjacent junction box, as may be required by certain electrical codes (such as Underwriters Laboratories' code 1598, pertaining to luminaires including recessed luminaires).

In the embodiment shown, each collar segment 110 includes a pair of collar flange sections 130. Azimuthally between each pair of collar flange sections 130, each collar segment 110 includes a clamp 150 for securing the foldable mounting collar 100 to a cut edge of wall or ceiling material. Only one clamp 150 is labeled as such in FIGS. 2A and 2B, while components of another clamp 150 on an opposing collar segment 110 are labeled only in FIG. 2A, for clarity of illustration. Clamps 150 may be of various types; one such type of clamp 150 is described herein, but other types may be used, without limitation. Upon reading and comprehending the disclosure herein, one of ordinary skill in the art will readily conceive of many alternatives, equivalents and modifications to the specific constructions shown as examples.

In FIGS. 2A and 2B, each clamp 150 includes a tab 152 that is coupled with, and extends above, the annular segment 120 of its associated collar segment 110. Tab 152 may be integrally formed with collar segment 110, or may be formed separately and coupled therewith. Tab 152 extends vertically from annular segment 120, and forms a substantially horizontal portion 153 at a distal end, as shown. Tab 152 forms a threaded aperture 154 within horizontal portion 153. A slider 155 is slidably coupled with tab 152, and is configured to extend downwardly between collar flange sections 130. A screw 156 passes through an aperture 158 formed by slider 155, and engages with threaded aperture 154 so as to adjust a position of slider 155 with respect to tab 152 and annular segment 120. A proximal end of slider 155 forms an attachment feature 160 to engage with wall or ceiling material. For example, in FIGS. 2A and 2B, attachment feature 160 is a radially outwardly extending tab 161 that is substantially parallel with annular segment 120, so that when screw 156 raises attachment feature 160 into contact with a wall or ceiling, attachment feature 160 and annular segment 120 grip the wall or ceiling material between them. Optionally, attachment feature 160 may form gripping features 162, illustrated as small teeth at corners of tab 161. Alternatively, ridges or a roughened surface may also be used as gripping features. Most wall or ceiling materials are soft enough to be indented by such teeth or other gripping features, so as to improve coupling of foldable mounting collar 100 thereto.

Figure 3:
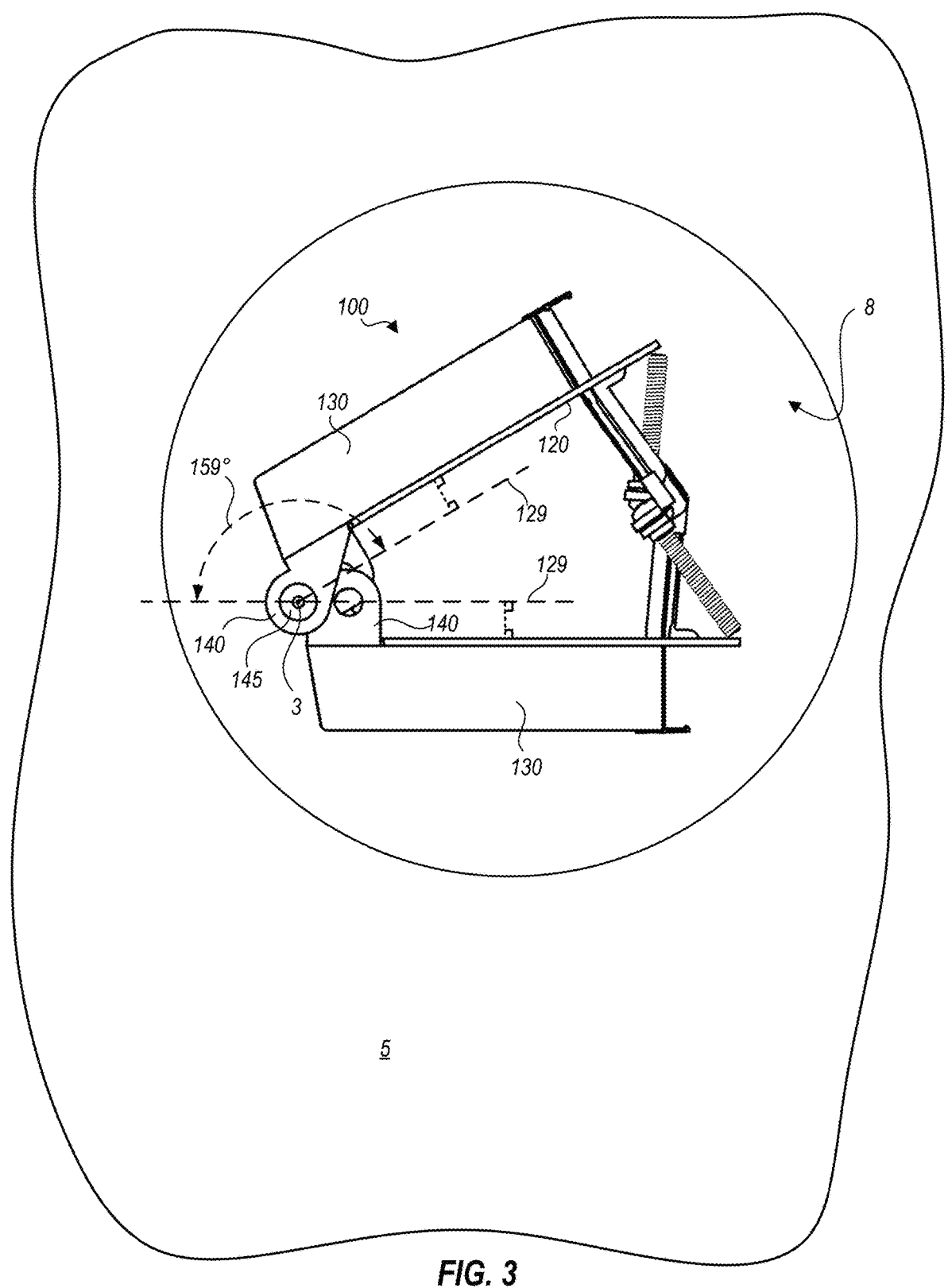
FIG. 3 is a side elevation of the foldable mounting collar of FIG. 1 that illustrates the collar folded for installation through an aperture in a ceiling, in accord with one or more embodiments.

FIG. 3 is a side elevation of foldable mounting collar 100 that illustrates mounting collar 100 folded for installation through aperture 8 in ceiling 5. In FIG. 3, reference lines 129 are parallel with respective upper surfaces of each annular segment 120, but pass through axis 3 (which extends in and out of the plane of FIG. 3, as shown) at pivot means 145, to illustrate an angle formed by rotation of one collar segment 110 with respect to the other. One collar segment 110 is rotated through a polar angle of about 159° about axis 3. The rotatability of collar segments 110 relative to one other allows mounting collar 100 to be folded and inserted through aperture 8, even though in its unfolded state (that is, with collar segments 110 positioned at a relative angle of zero) it could not be inserted therethrough. An installer simply folds segments 110 as shown in FIG. 3, inserts mounting collar 100 through aperture 8, and unfolds mounting collar 100 on the distal side of ceiling 5, for placement upon a distal edge of the wall or ceiling surface.

Figure 4A:
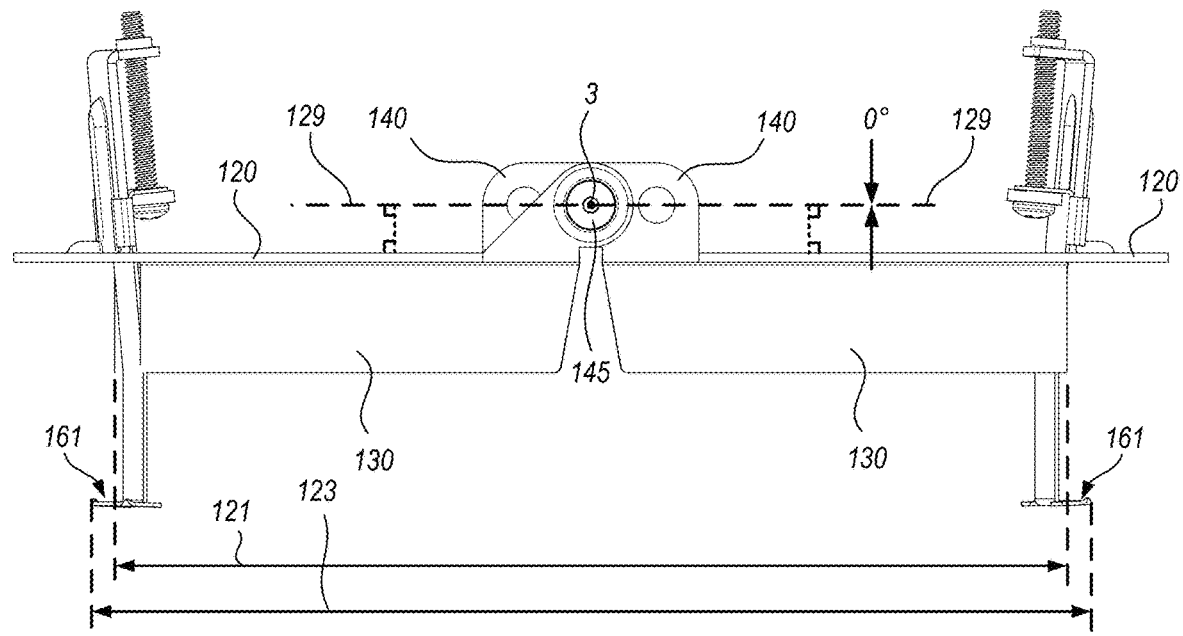
FIG. 4A illustrates the foldable mounting collar of FIG. 1 unfolded to a polar angle of zero, in accord with one or more embodiments.
Figure 4B:
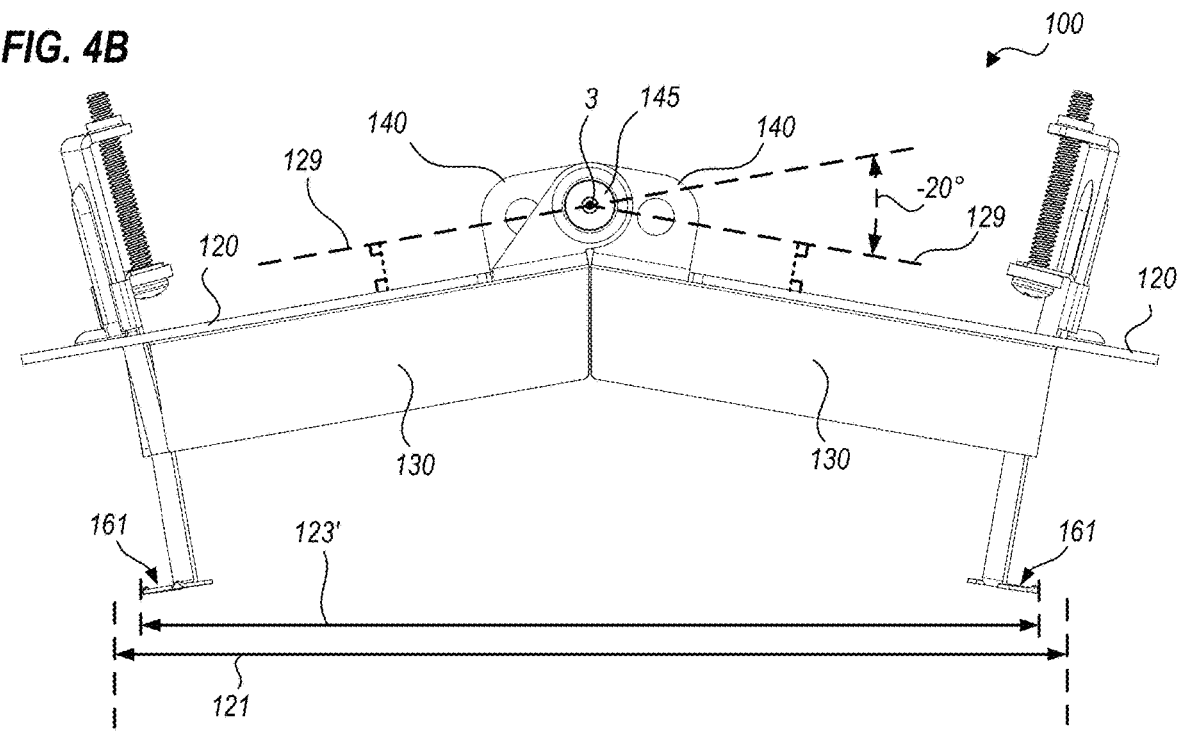
FIG. 4B illustrates the foldable mounting collar of FIG. 1 unfolded to a polar angle of about −20°, in accord with one or more embodiments.

FIG. 4A illustrates foldable mounting collar 100 unfolded to a polar angle of zero (e.g., with both collar segments 110 in the same plane), and FIG. 4B illustrates mounting collar 100 unfolded to a polar angle of about −20°. In the position shown in FIG. 4B, the angle formed by segments 110 brings attachment features 160 radially inward (e.g., toward one another) so that attachment features 160 can fit through aperture 8 from the distal side. Thus, in this example, when the second annular segment 120 is at a polar angle of −15° or lower (further from horizontal) with respect to the first annular segment 120, a distance 123' between furthest extents of outwardly extending tabs 161 is less than the inner diameter 121 defined by annular segments 120 when at a polar angle of zero. By comparing FIG. 4B with FIG. 4A, it can be seen that if annular segments 120 could not be unfolded to a polar angle of about −15° or more (that is, a more negative angle) and if aperture 8 that is about the same as inner diameter 121 formed by collar flange sections 130 when annular segments 120 are horizontal, attachment features 160 could not be extended through aperture 8 from the distal side of ceiling 5; they would be blocked by outwardly extending tabs 161. The ability to unfold mounting collar 100 to about the angle shown enables placement of annular segments 120 on a distal surface of ceiling 5, followed by engagement of tabs 161 with the ceiling material, in preparation for installing a light fixture.

Pivot means 145 may optionally provide a small resistance to rotation, so that when manipulated to a given polar angle by an installer, annular segments 120 remain in that angle until they are again manipulated, so that the installer can use his hands for other purposes, rather than have to repeatedly adjust annular segments 120. This resistance to rotation can be provided by, for example, using a blind rivet as pivot means 145, with the blind rivet being closely matched in diameter to corresponding holes in hinge flanges 140. Alternatively, and optionally, pivot means 145 may be spring loaded so as to bias collar segments 110 into a negative polar angle (that is, toward the −15° or more negative polar angle) to facilitate installation. In this case, foldable mounting collar 100 is folded together, held in the folded position by the installer, and inserted through aperture 8. Then, when released, the force of the spring loading unfolds collar segments 110 toward the negative polar angle to facilitate passing attachment features 160 back toward the distal side of the mounting surface. When clamps 150 are manipulated so as to grip the mounting surface, the force of the spring loading is overcome, so that annular segments 120 lie flat upon the distal side of the mounting surface.

Figure 5:
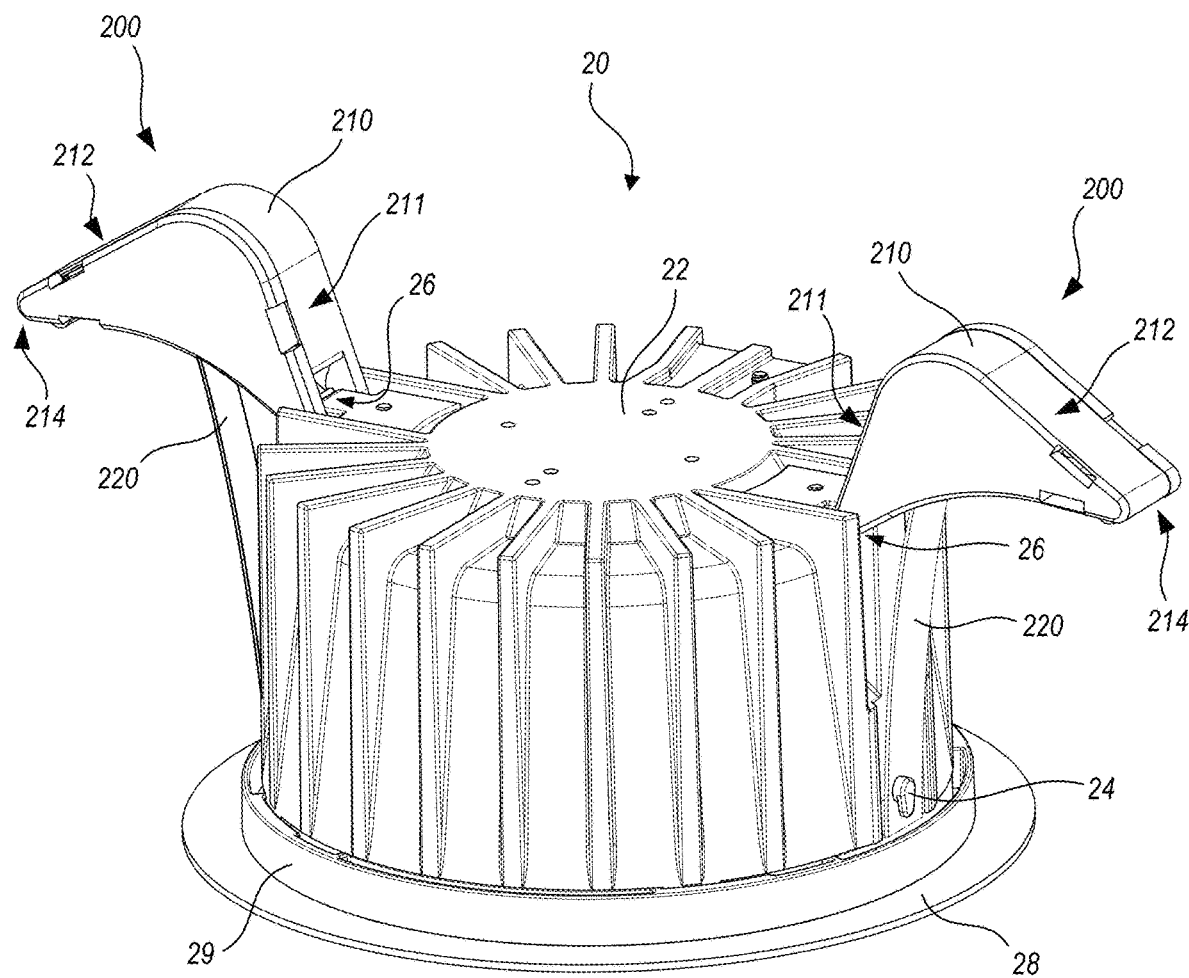
FIG. 5 is a perspective view of the light fixture of FIG. 1, illustrating two retention assemblies that are tilted partially upwards from the installed positions illustrated in FIG. 1, in accord with one or more embodiments.

FIG. 5 is a perspective view of light fixture 20, illustrating two retention assemblies 200 that are tilted partially upwards from the installed positions illustrated in FIG. 1. As shown in FIG. 5, light fixture 20 includes a light fixture housing 22, and an optional trim flange 28 that can be attached to, or detached from, housing 22 via a coupling element 29. For example, trim flange 28 and coupling element 29 may be decoupled from housing 22 during installation of housing 22 from above a mounting surface such as a ceiling or a ceiling tile, and attached to housing 22 as part of finalizing the installation (see FIG. 9). Housing 22 may be formed, for example, of a die cast metal such as aluminum, or another suitable material, and may include fins or other features to promote heat dissipation. Each retention assembly 200 includes a body 210 and a spring 220. Spring 220 extends within and emerges from body 210, and couples with a coupling feature 24, as shown in FIG. 5 and discussed further below. Each body 210 couples with housing 22 through a hinge 26. One exemplary hinge 26 based on an axle is described in detail in connection with FIG. 6, but other mechanisms may be used for hinge 26, for example, a blind rivet, a post, a dowel, a pin, a screw, a circular track, a bearing race, or a ball and socket joint. One of ordinary skill in the art will readily conceive of many alternatives, equivalents and modifications. Each body 210 may form an upper surface 211, a distal surface 212, and a distal tip 214, as shown. Upper surface 211 extends along an upper side of body 210, away from hinge 26, and distal surface 212 extends along a side of body 210 that adjoins upper surface 211 and extends to distal tip 214 of body 210. Each spring 220 exerts a downward force on the corresponding body 210 (which force translates to a torque on body 210, about hinge 26) to assist in installation of light fixture 20 and to bear the weight of light fixture 20 after installation.

Figure 6:
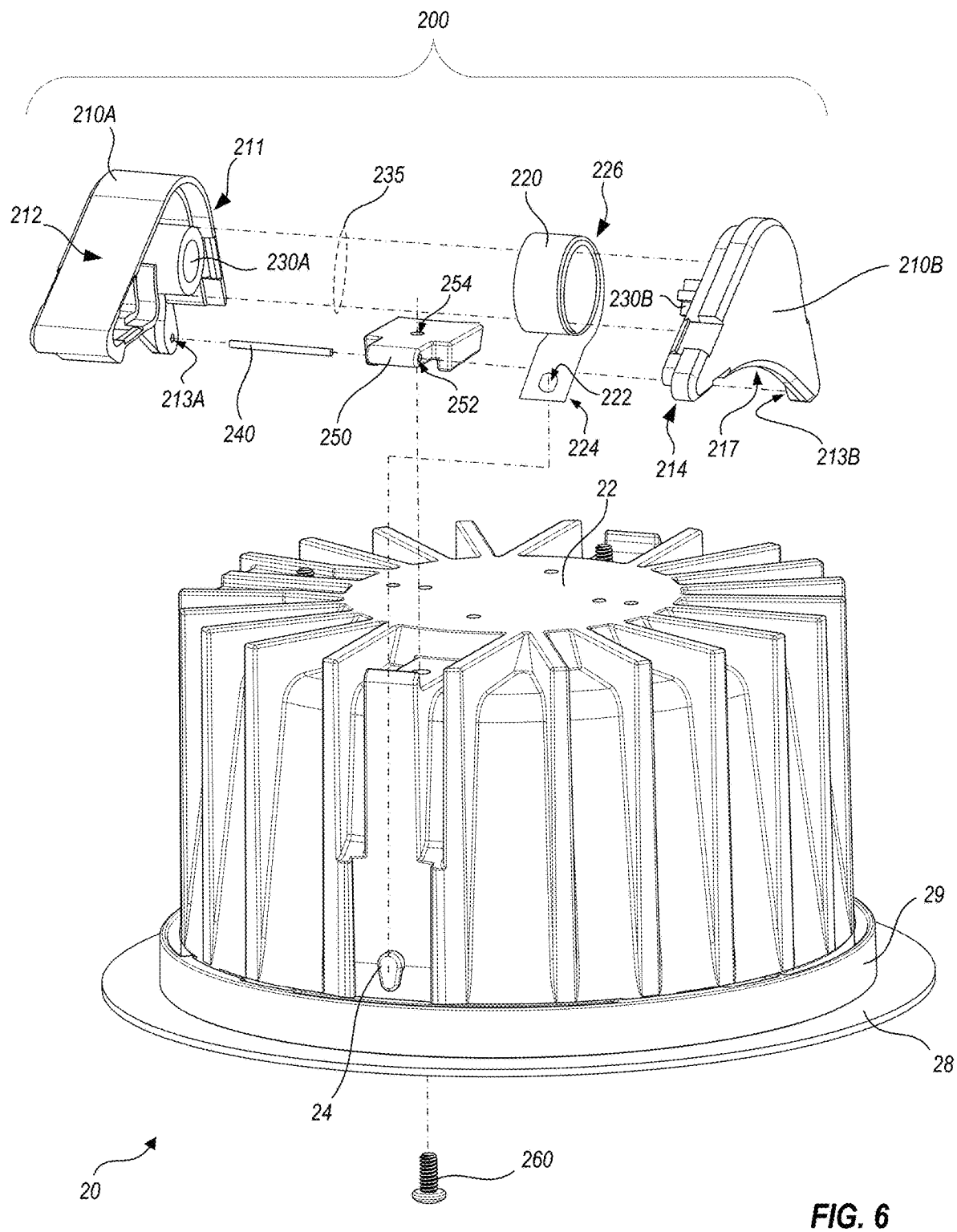
FIG. 6 is an exploded view that illustrates the light fixture of FIG. 1 and only one retention assembly, to show exemplary component parts thereof and their cooperation, in accord with one or more embodiments.

FIG. 6 is an exploded view that illustrates light fixture 20 and only one retention assembly 200, to show exemplary component parts thereof and their cooperation. Retention assembly 200 includes two body components 210A and 210B that, together, form body 210 as shown in FIG. 5. Upper surface 211 and/or distal surface 212 of body 210 may be formed by either of, or a combination of both of, body components 210A and 210B. For example, FIG. 6 shows body component 210A forming upper surface 211 and distal surface 212. Lower edges 217 of body 210 are advantageously concave to facilitate installation of light fixture 20, as discussed below in connection with FIGS. 7 and 8 (lower edge 217 of body component 210A faces away in the view of FIG. 6 and is thus obscured in FIG. 6). Upper surface 211 and/or distal surface 212 may be, for example, substantially solid surfaces on respective upper and radially outward sides of body 210 (see, e.g., completed body 210 in FIG. 5, and body component 210A in FIG. 6). However, body 210 will be at least partially open between lower edges 217 to allow a portion of spring 220 therebetween, as discussed below. Body components 210A and 210B are advantageously formed of a relatively lightweight yet hard plastic such as polycarbonate, but could be formed of other plastics, metals and/or other mechanically strong materials.

An optional holder 250 couples with housing 22, for example by engaging a screw 260 within a threaded aperture 254. In this embodiment, a first axle 240 passes through an aperture 252 of holder 250 and engages within recesses 213A, 213B formed within respective body components 210A and 210B, to form hinge 26 (see FIG. 5) (FIG. 6 illustrates the position of recess 213B, but recess 213B itself faces away in the perspective of the drawing and is thus not visible). Holder 250 is optional in the sense that it could be built into housing 22. However, in this and certain other embodiments, holder 250 is a separate part from housing 22, as shown in FIG. 6. Having holder 250 as a separate part enables retention assemblies 200 to be assembled separately from housing 22 in manufacturing. In this way, retention assemblies 200 can be joined to housing 22 by adding screw 260 and coupling spring 220 with coupling feature 24, as discussed below.

A second axle 235, designated schematically by broken lines in FIG. 6, is formed within body 210, and is referred to herein as an internal axle. For example, as shown in FIG. 6, internal axle 235 is formed by portions 230A and 230B of respective body components 210A and 210B, where portion 230A is an outer, female portion while portion 230B is a male portion that fits within portion 230A. However, in other embodiments, a male/female structural relationship is not required to form internal axle 235. For example, embodiments may form internal axle 235 by portions of body components 210A and 210B that abut one another, by forming the axle as a single piece (e.g., using portion 230A only, without portion 230B) or by adding a component (e.g., a screw) that extends through at least one of body components 210A and 210B, and may engage the other, and/or combinations of these approaches. One of ordinary skill in the art will readily conceive of many alternatives, equivalents and modifications.

Spring 220 is a coil of material that is positioned so that a proximal end 226 of spring 220 coils about internal axle 235 and is thus substantially enclosed within body 210. In one embodiment, spring 220 is formed of a sheet of stainless steel; other embodiments may form spring 220 of other material(s) and/or shapes that can hold a coiled shape, yet can be stretched so as to provide a force opposite to the direction of the stretch. Spring 220 may be considered a constant force spring in that it can maintain a specified force consistently over displacement. This configuration is particularly advantageous over use of a traditional spring, because a force supplied by spring 220 can be reasonable for the application without being excessive at higher displacements. Also, spring 220 can be made to fit within a small space, and can be mostly enclosed by body 210, reducing risk of entanglement with other components, nearby insulation or the like. Spring 220 is illustrated in a relaxed state in FIG. 6, but during manufacturing of retention assembly 200, a distal end 224 of spring 220 is pulled away from internal axle 235, and coupled with coupling feature 24 of housing 22. For example, as shown in FIG. 6, coupling feature 24 may be a protrusion that forms a downwardly facing lip at a lower end thereof, so that spring 220 can be placed with coupling feature 24 extending through an aperture 222 formed in spring 220 (e.g., as shown in FIG. 5) with the lip holding distal end 224 in place. However, other configurations of coupling feature 24 are possible, as are ways of engaging spring 220 with coupling feature 24. All variations in the configuration of coupling feature 24, and manners of coupling spring 220 with coupling feature 24, are considered within the scope of the present disclosure.

Once spring 220 is placed about internal axle 235, and optionally, holder 250 and axle 240 are in place, body components 210A and 210B can be joined to form a complete retention assembly 200.

When distal end 224 of spring 220 extends to engage coupling feature 24, spring 220 will be in tension, with distal end 224 pulling upwardly on coupling feature 24. At the same time, proximal end 226 exerts a downward force on internal axle 235, which force translates to a torque that urges body 210 to rotate about hinge 26 toward coupling feature 24. A coiling force of spring 220 is chosen to provide sufficient force to pull retention assemblies 200 firmly toward coupling feature 24 (thus, generally downward) so that distal tips 214 of retention assemblies 200 can support the entire weight of light fixture 20 when resting on a ceiling, a ceiling tile, a mounting collar, an installation pan or the like. However, the force of spring 220 can be overcome by manipulating retention assemblies 200 by hand, to facilitate installation of light fixture 20, as described below.

All variations in dimensions, materials and other properties of retention assemblies 200 and their components, light fixture housing 22 and coupling feature 24 thereof, and trim flange 28, are considered within the scope of the present disclosure. Some exemplary ranges are now given for a light fixture to be installed within an aperture 8 having a nominal diameter of 5 inches, but embodiments are not limited to these ranges. An overall height of housing 22 with trim flange 28 may be within the range of 2 to 3.5 inches; of this height, an portion of housing 22 that extends above the mounting surface may be within the range of 1.5 to 3 inches. Distal tips of each pair of retention assemblies 200 of a single light fixture 20 may exert a net, combined downward force in the range of 1 to 5 pounds in their installed positions. Length of each body 210 of retention assemblies 200 (e.g., distance from hinge 26 to distal tip 214 of each body 210) may be in the range of about 1.75 to 3 inches. Spring 220 may be in the range of about 0.2 to 0.8 inches in width, 0.005 to 0.03 inches in thickness, and 5 to 10 inches in length if completely uncoiled. In its coiled state, a diameter of the coiled portion of spring 220 may be about 0.35 to 0.75 inches. For example, the coiled portion of spring 220 may be at least large enough to surround internal axle 235, which facilitates assembly because spring 225 may be placed loosely over internal axle 235. However, it is also possible to use a spring 220 having a coiled portion smaller than internal axle 235, making provisions to stretch or partially uncoil spring 220 to wrap it around internal axle 235 during assembly.

Figure 7:
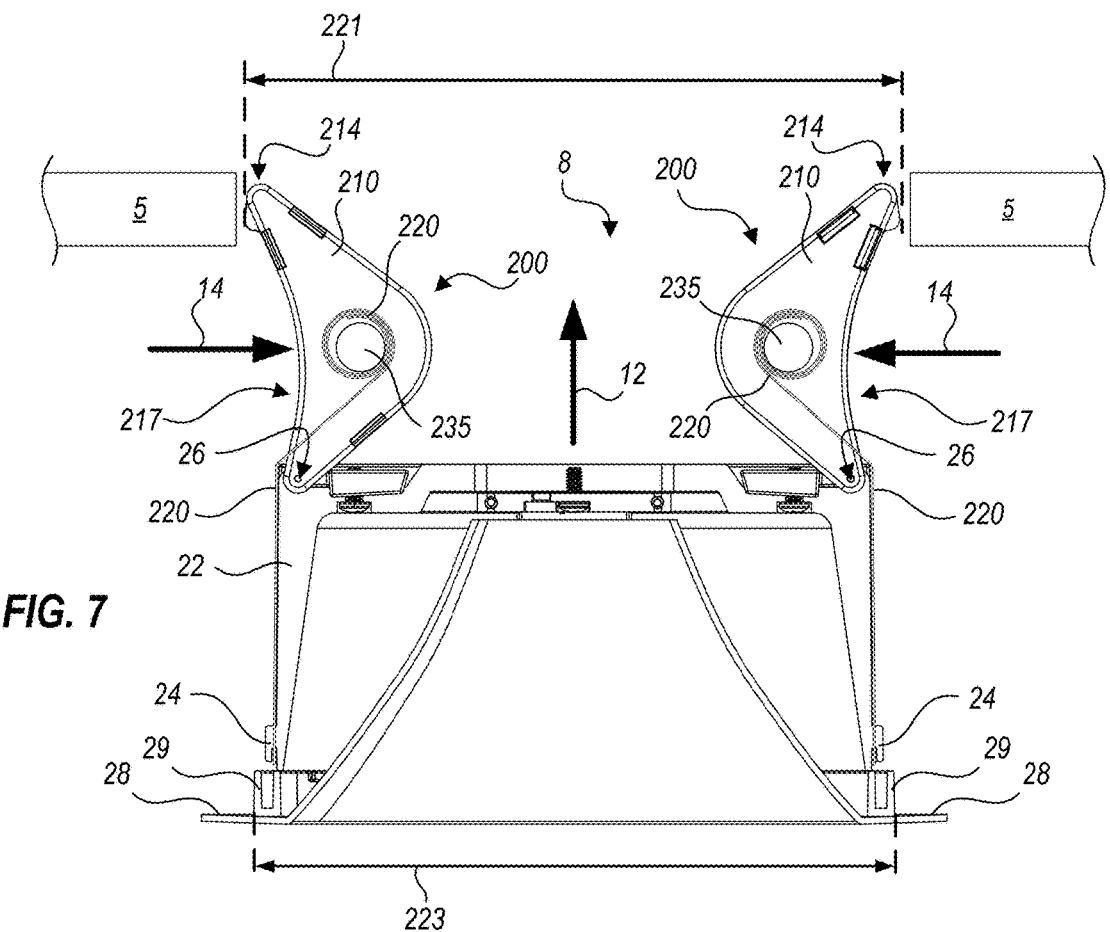
FIG. 7 illustrates how retention assemblies facilitate installation of a light fixture from below a ceiling, in accord with one or more embodiments.
Figure 8:
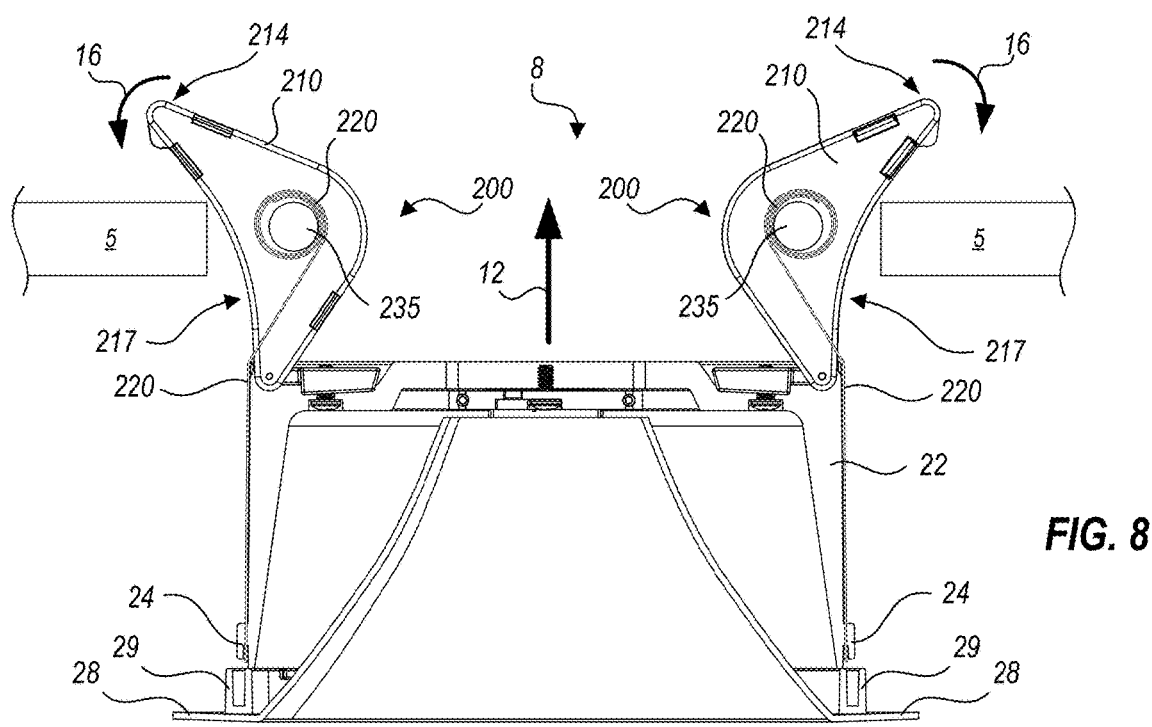
FIG. 8 illustrates how retention assemblies facilitate installation of a light fixture from below a ceiling, in accord with one or more embodiments.

FIGS. 7 and 8 illustrate how retention assemblies 200 facilitate installation of light fixture 20 from below a mounting surface, such as ceiling 5. In FIG. 7, the installer pushes retention assemblies 200 upward and inward, by hand, relative to light fixture 20, that is, in the direction of arrows 14. When retention assemblies 200 are in the upward position illustrated in FIG. 7, they can fit within an aperture 8 formed in ceiling 5, as shown. Hinge 26 and spring 220 allow sufficient range of motion for the body to rotate into the position shown in FIG. 7, wherein a distance 221 between distal tips 214 is less than a maximum fixture dimension 223 that is the greater of an outer dimension of light fixture housing 22, and an outer dimension of coupling element 29. That is, if other elements of the light fixture (e.g., housing 22 and coupling element 29) can fit within aperture 8, then bodies 210 will also fit within aperture 8. Positioned as shown in FIG. 7, the installer need only push light fixture 20 upwards a short way in the direction of arrow 12 (e.g., upward).

In FIG. 8, bodies 210 of retention assemblies 200 are illustrated as rotating in the direction of arrows 16, in response to the torque exerted by springs 220, when distal tips 214 of each retention assembly 200 clear an upper surface of ceiling 5. At this point, retention assemblies 200 can "take over" installation by continuing to rotate bodies 210 downwards, e.g., in the directions suggested by arrows 16, driven by the torque applied by springs 220. As retention assemblies 200 rotate downwards, concave lower edges 217 slide along upper edges of aperture 8, raising light fixture 20 further in the direction of arrow 12. A coupling element 29 that is integrated with trim flange 28 can be guided into place within aperture 8, and trim flange 28 seats against a lower surface of ceiling 5 (e.g., in the installed position illustrated in FIG. 1). The concave profile of lower edges 217 provide a smooth transfer of force applied by springs 220 to ceiling 5, whereas a straight or convex profile would result in changes in applied force depending on the momentary angle of retention assembly 200. The smooth transfer of force assists the installer by helping light fixture 20 move predictably as the installer guides features such as coupling element 29 into their final positions.

Figure 9:
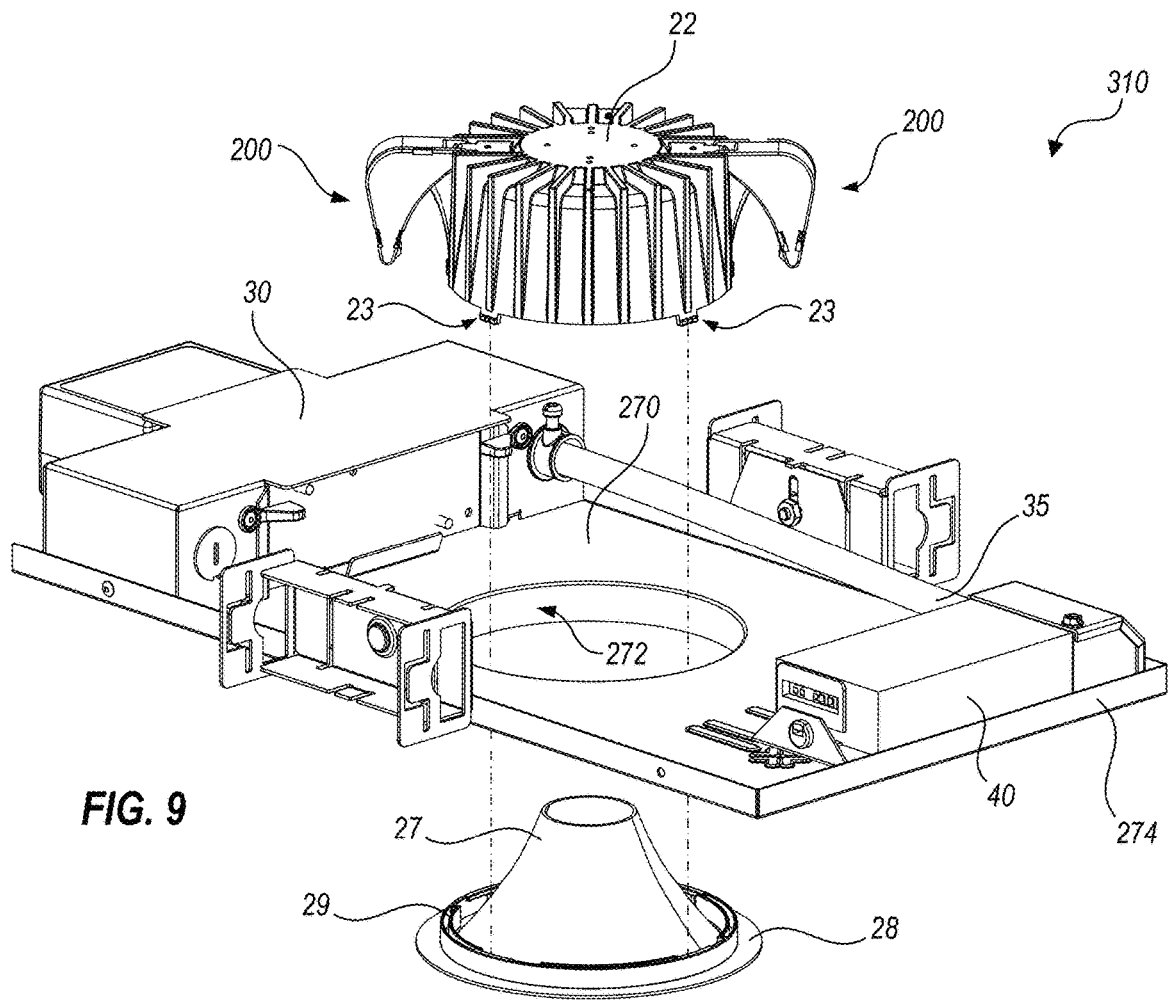
FIG. 9 is an exploded view of major portions of a light fixture, in accord with one or more embodiments.
Figure 10:
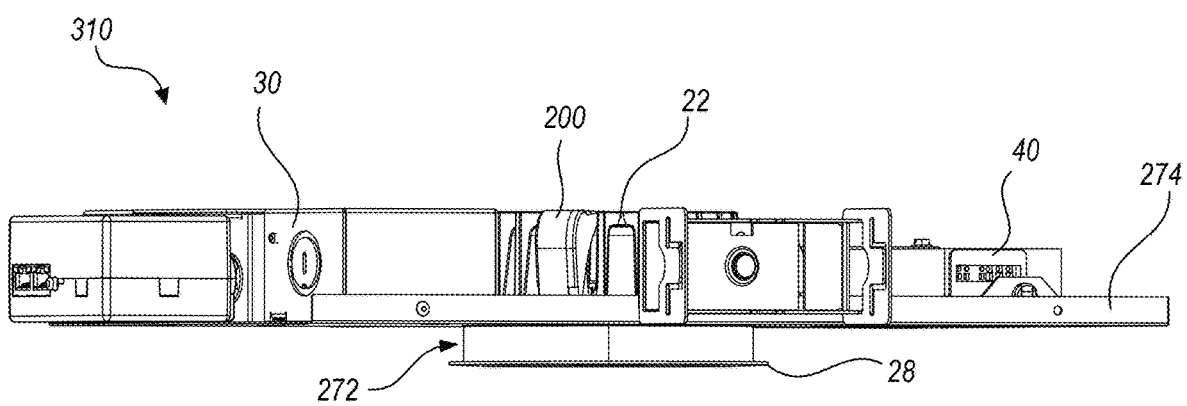
FIG. 10 is a side elevation that illustrates how the low profile of the light fixture of FIG. 9 is facilitated by the use of the retention assemblies thereof, in accord with one or more embodiments.

It may also be advantageous to install light fixture 20 within an aperture 8 with an upper corner that is protected by a relatively hard surface, such as that provided by foldable mounting collar 100 (e.g., see FIGS. 1 through 4B) or an installation pan (e.g., see FIGS. 9 and 10). The relatively hard surface reduces friction as lower edges 217 slide over the upper corner of aperture 8, enhancing the smooth transfer of force applied by springs 220.

FIG. 9 is an exploded view of major portions of a light fixture 310. The components of light fixture 310 facilitate installation in situations where both sides of a mounting surface are accessible. One example of such a situation is where a ceiling tile can be provided with an aperture, light fixture 310 can be fitted to a ceiling tile, or a piece of drywall that is to be installed. After light fixture 310 is installed, the ceiling tile or drywall that is fitted with light fixture 310 can be fitted into a dropped ceiling grid, or mounted to ceiling joists or the like. An installation pan 270 provides locations for a junction box 30 and a driver box 40, which may connect via a conduit 35, in similar manner as illustrated in FIG. 1. Installation pan 270 may optionally form an aperture flange 272 and/or an upper lip 274, as shown in FIG. 9. Housing 22 connects with retention assemblies 200, as illustrated in FIGS. 5-8, and is shown above installation pan 270 in the exploded view of FIG. 9. Housing 22 forms optional coupling features 23 that can engage with or disengage from a corresponding coupling element 29 that is integrated with trim flange 28, as shown below installation pan 270. Coupling element 29 may be, for example, a ring with slots adapted to receive coupling features 23. However, other configurations of coupling features 23 are possible, as are ways of engaging coupling element 29 with coupling features 23. All variations in the configuration of coupling features 23, and the manner of engaging coupling element 29 with coupling features 23, are considered within the scope of the present disclosure.

Also illustrated in FIG. 9 is an optional reflector 27 that is integrated with trim flange 28 and coupling element 29. The integration of optional reflector 27 and/or trim flange 28 with coupling element 29 provides a way to customize and/or retrofit the appearance or light distribution properties of light fixture 310.

FIG. 10 is a side elevation that illustrates how the low profile of light fixture 310 is facilitated by the use of retention assemblies 200. A mounting surface (for example, a ceiling) is not shown in FIG. 10 so as not to obscure components that extend through and below the mounting surface. Junction box 30, which may be a standard product (e.g., provided separately from light fixture 310) sets a minimum height above the mounting surface that must be available in order to install any light fixture. Installation pan 270, driver box 40, housing 22 and retention assemblies 200 (when in the installed position) do not exceed the height of junction box 30. Retention assemblies 200 improve upon previously known apparatus for installing a light fixture, by providing a spring loaded mechanism in a small space. The mechanism is movable to first fit within an installation aperture, and then to move into an installed position that contacts a mounting surface material (e.g., a ceiling tile) radially outside the aperture to support the weight of the light fixture. Retention assemblies 200 also substantially enclose and protect proximal end 226 of spring 220, and constrain movements thereof, so that as compared to unconstrained springs and the like, retention assemblies 200 can generate greater pull forces in a compact form, and do not get out of position and/or become tangled with other apparatus or insulation near the installation site. Unconstrained springs can also be unsightly compared to the finished appearance of retention assemblies 200.

Optional aperture flange 272 may extend below an upper surface of the mounting surface, upon which the rest of installation pan 270 rests. When provided, aperture flange 272 may adjoin and extend from a bottom surface of installation pan that sits upon the upper surface of a mounting surface, so as to protect the edge of an aperture therein, and provide a hard surface for retention assemblies 200 to slide over, as discussed above. Coupling features 23 and coupling element 29 (see FIG. 9) couple with one another inside (e.g., radially within) aperture flange 272, but at least trim flange 28 extends below aperture flange 272 and below the mounting surface. Springs 220 of retention assemblies 200 can be provided with a coiling force sufficient to pull trim flange 28 up to, and maintain tight contact with, a lower side of the mounting surface. However, the force provided by springs 220 is also chosen such that light fixture 310 (and/or light fixture 20 discussed above) can be removed by simply pulling downwards, causing retention assemblies to rotate upwardly until they fit within the aperture from which the light fixture is being removed.

Figure 11:
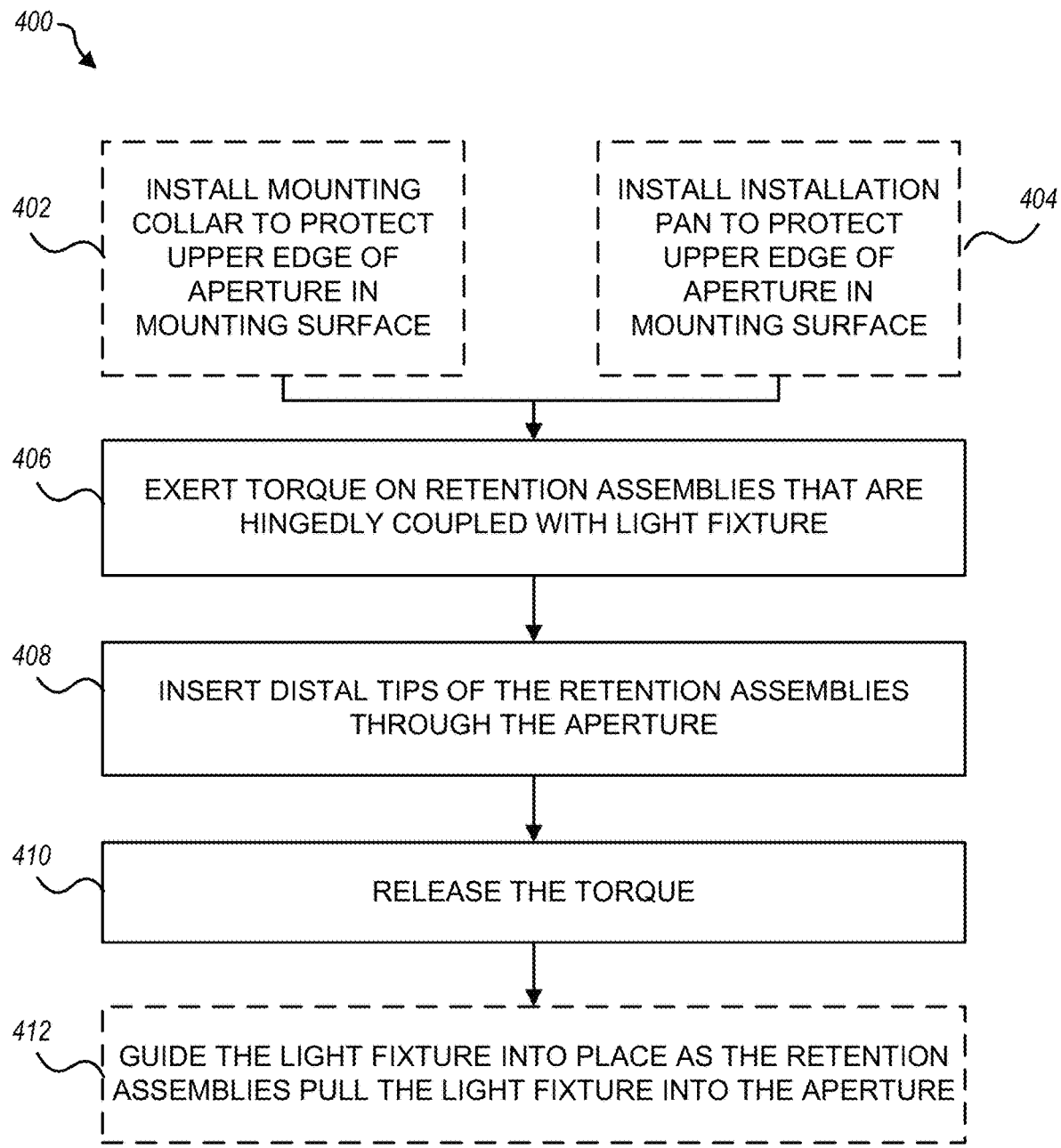
FIG. 11 is a flowchart of a method for installing a light fixture, according to one or more embodiments.

FIG. 11 is a flowchart of a method 400 for installing a light fixture, according to one or more embodiments. Method 400 can be used, for example, to install light fixture 10 (FIG. 1), light fixture 310 (FIGS. 9 and 10) or other light fixtures, as explained below. When installing light fixture 10 including mounting collar 100, a first optional step 402 installs the mounting collar to protect an upper edge of an aperture in a mounting surface where the light fixture is being installed. Alternatively, when installing light fixture 310 including installation pan 270, a different, optional step 404 installs the installation pan to protect the upper edge of the aperture. When no mounting collar or installation pan is to be installed, optional steps 402 and 404 are not performed. In step 406, an installer exerts a torque on retention assemblies that are hingedly coupled with the light fixture, so that the retention assemblies rotate upward until distal tips of the retention assemblies fit within the aperture of the mounting surface. An example of step 406 is exerting torque on retention assemblies 200 so that they fit within aperture 8, FIG. 7. In step 408, the distal tips of the retention assemblies are inserted through the aperture. An example of step 406 is actually inserting distal tips 214 of retention assemblies 200 through aperture 8, FIG. 7. In step 410, the installer releases the torque, so that the retention assemblies pull the light fixture into the aperture. An example of step 410 is the installer releasing the torque, so that the retention assemblies pull the light fixture into the aperture, as shown in FIG. 8. In an optional step 412, the installer guides the light fixture into place as the retention assemblies pull the light fixture into the aperture.

Figure 12:
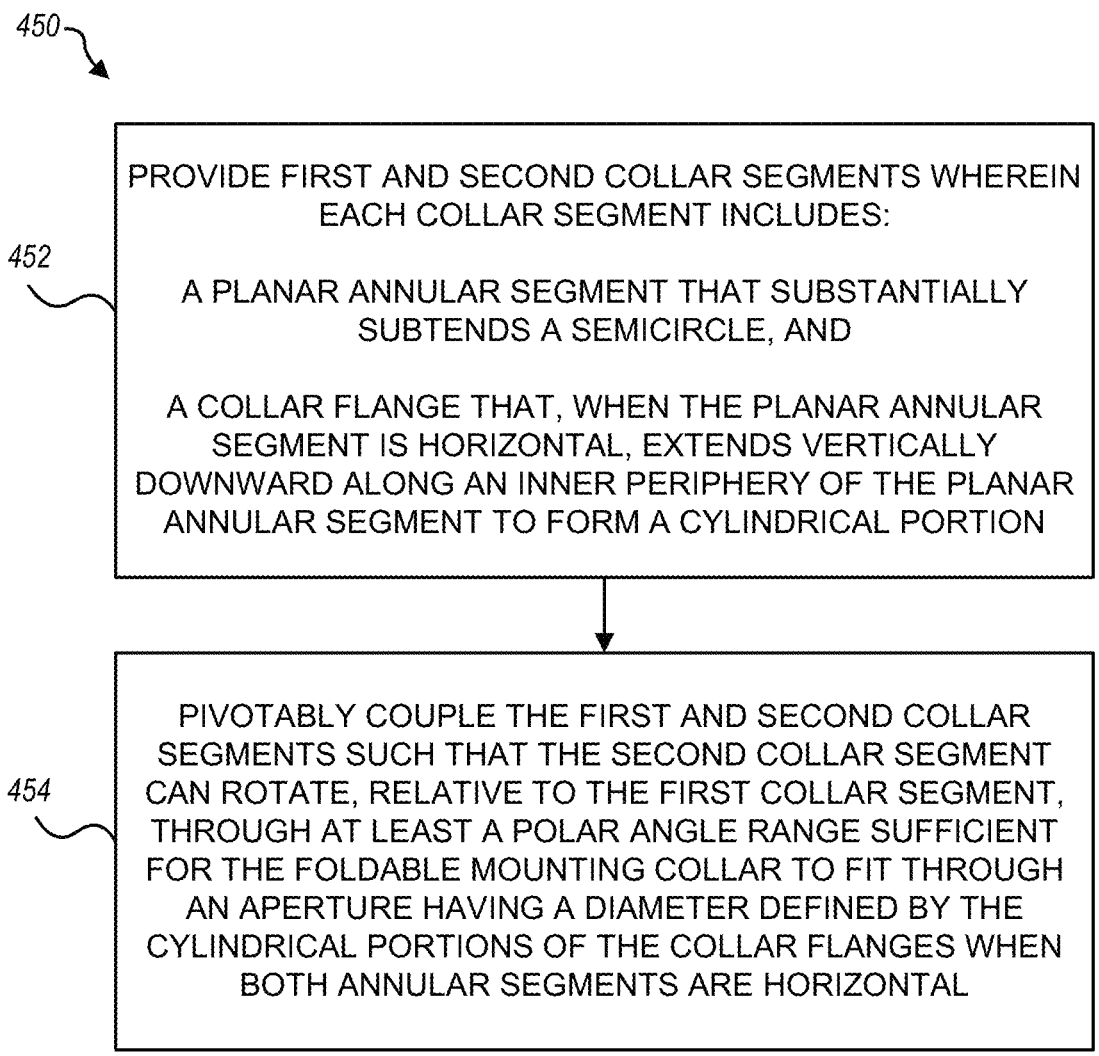
FIG. 12 is a flowchart of a method for forming a foldable mounting collar, according to one or more embodiments.

FIG. 12 is a flowchart of a method 450 for forming a foldable mounting collar, according to one or more embodiments. Method 450 can be used, for example, to form foldable mounting collar 100 (FIGS. 1-4B). A first step 452 provides first and second collar segments, for example, collar segments 110, FIGS. 2A, 2B. Each collar segment includes a planar annular segment that substantially subtends a semicircle, and a collar flange that, when the planar annular segment is horizontal, extends vertically downward along an inner periphery of the planar annular segment to form a cylindrical portion. An example of step 452 is providing each collar segment with a planar annular segment 120, and a collar flange section 130, FIGS. 2A, 2B. Another step 454 pivotably couples the first second collar segments such that the second collar segment can rotate, relative to the first collar segment, through at least a polar angle range sufficient for the foldable mounting collar to fit through an aperture having a diameter defined by the cylindrical portions of the collar flanges when both annular segments are horizontal. An example of step 454 is coupling collar segments 110 with pivot means 145, FIGS. 2A, 2B.

Figure 13:
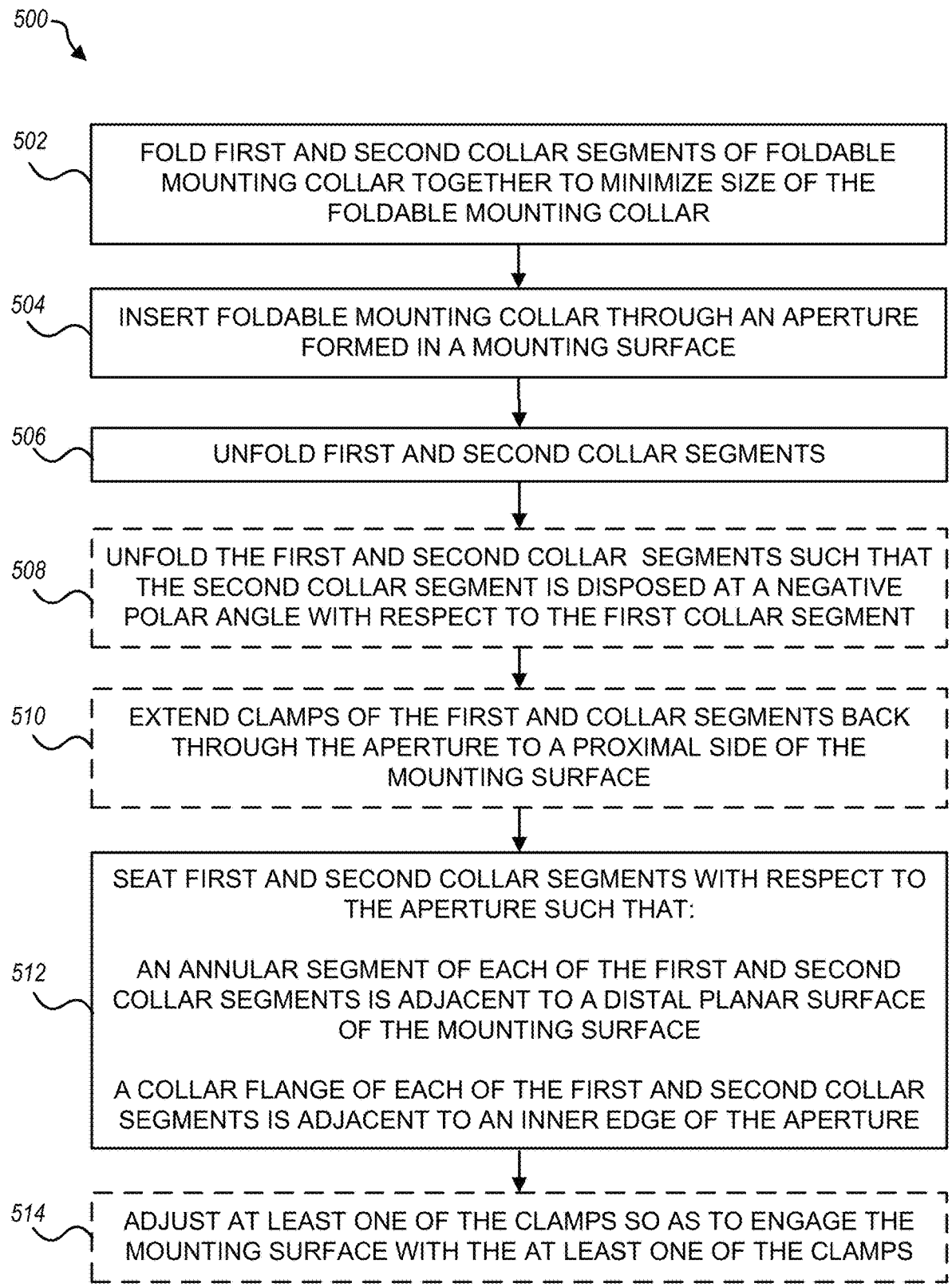
FIG. 13 is a flowchart of a method for installing a foldable mounting collar, according to one or more embodiments.

FIG. 13 is a flowchart of a method 500 for installing a foldable mounting collar, according to one or more embodiments. Method 500 can be used, for example, to install foldable mounting collar 100 (FIGS. 1-4B). A first step 502 folds first and second collar segments of the foldable mounting collar to minimize size of the foldable mounting collar. An example of step 502 is folding collar segments 110 of mounting collar 100, FIGS. 2A, 2B, into the configuration illustrated in FIG. 3. A second step 504 inserts the foldable mounting collar through an aperture formed in a mounting surface. An example of step 504 is inserting foldable mounting collar 100 through aperture 8, as illustrated in FIG. 3. Another step 506 unfolds the first and second collar segments; an example of this is unfolding foldable mounting collar 100 to at least a polar angle of zero, as illustrated in FIG. 4A. In an optional step 508, the foldable mounting collar is unfolded still further, such that the second collar segment is disposed at a negative polar angle with respect to the first collar segment. An example of step 508 is unfolding foldable mounting collar 100 to the negative polar angle illustrated in FIG. 4B. A further optional step 510 extends clamps of the first and second collar segments back through the aperture to a proximal side of the mounting surface. An example of step 510 is inserting foldable mounting collar 100, unfolded to the negative polar angle provided by step 508, through aperture 8, FIG. 3. The negative polar angle brings the clamps together so that they can fit through aperture 8, as discussed above. A further step 512 seats the first and second collar segments with respect to the aperture, such that an annular segment of each of the first and second collar segments is adjacent to a distal planar surface of the mounting surface, and a collar flange of each of the first and second collar segments is adjacent to an inner edge of the aperture. An example of step 512 is seating collar segments 110 (FIGS. 2A, 2B) flat on an upper surface of mounting surface 5, FIG. 1. A further optional step 514 adjusts at least one of the clamps so as to engage the mounting surface with the at least one of the clamps. An example of step 514 is operating screw 156 of at least one clamp 150, FIG. 2A, so as to engage tab 161 with mounting surface 5.

The foregoing is provided for purposes of illustrating, explaining, and describing embodiments of the present invention. Further modifications and adaptations to these embodiments will be apparent to those skilled in the art and may be made without departing from the scope or spirit of the invention. Different arrangements of the components depicted in the drawings or described above, as well as components and steps not shown or described, are possible. In but one example, a light fixture could have more than two retention assemblies, to spread the weight of a light fixture about a larger area and/or improve the fit of a light fixture to a mounting surface. In another example, the disclosed foldable mounting collar, light fixture housings, trim rings and the like can be configured for installation in a square or rectangular aperture, instead of the circular aperture discussed. One of ordinary skill in the art will readily conceive of many alternatives, equivalents and modifications. Similarly, some features and subcombinations are useful and may be employed without reference to other features and subcombinations. Examples of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A foldable mounting collar, comprising:
   first and second collar segments, wherein each collar segment includes:
   a planar annular segment that substantially subtends a semicircle,
   a collar flange that, when the planar annular segment is horizontal, extends vertically downward along an inner periphery of the planar annular segment, such that the collar flange forms a cylindrical portion, and
   two hinge flanges that, when the planar annular segment is horizontal, extend upwardly from each end of the semicircle formed by each planar annular segment;
   wherein the foldable mounting collar further comprises pivot means that hingedly couple opposing pairs of the hinge flanges of the first and second collar segments; and
   wherein the second collar segment can rotate, relative to the first collar segment, through at least a polar angle range sufficient for the foldable mounting collar to fit through an aperture having a diameter defined by the cylindrical portions of the collar flanges when both collar segments are horizontal.

2. The foldable mounting collar of claim 1, wherein:
   an azimuthal arc subtended by each annular segment is at least 160°, and
   when the first collar segment is horizontal, the second collar segment can rotate at least through a polar angle range of at least positive 60° through −5°.

3. The foldable mounting collar of claim 1, wherein when the first collar segment is horizontal, the second collar segment can rotate at least through a polar angle range of positive 135° through −15°.

4. The foldable mounting collar of claim 1, wherein:
   hardware, including the hinge flanges, that is fixedly connected with and above the planar annular segments, and
   hardware, including the collar segments, that is fixedly connected with and below the planar annular segments, do not interfere with one another as the second collar segment rotates throughout the polar angle range.

5. The foldable mounting collar of claim 1, wherein each of the pivot means comprises one or more of an axle, a rivet, a post, a dowel, a screw, a circular track, and a bearing race.

6. The foldable mounting collar of claim 1, wherein the collar flange of each of the first and second collar segments comprises a fixed height that is between 0.25 inch and 1.0 inch, extending vertically downward from the corresponding annular segment.

7. The foldable mounting collar of claim 1, wherein each of the first and second collar segments further comprises a clamp for securing the foldable mounting collar to a cut edge of a wall or ceiling material.

8. The foldable mounting collar of claim 7, wherein:
the collar flanges of each of the first and second collar segments comprise a first and a second collar flange section; and
each clamp is disposed azimuthally between the first and second collar flange section of the corresponding collar segment.

9. The foldable mounting collar of claim 7, wherein each clamp comprises:
a tab that is coupled with, and extends above, the annular segment of the at least one of the first and second collar segments, the tab forming a threaded aperture;
a slider that is slidably coupled with the tab and configured to extend downwardly therefrom; and
a screw that passes upwardly through an aperture in the slider and engages with the threaded aperture of the tab.

10. The foldable mounting collar of claim 9, wherein the slider forms a radially outwardly extending tab at a lower end thereof, the outwardly extending tab forming one or more upwardly facing teeth to engage the wall or ceiling material when the screw is adjusted so as to bring the outwardly extending tab into contact with the wall or ceiling material.

11. The foldable mounting collar of claim 10, wherein:
when the first and second collar segments are coupled by the pivot means at a polar angle of zero, the planar annular segments define an inner diameter and an outer diameter, and the outwardly extending tabs extend radially outside the inner diameter; and
when the second collar segment is at a polar angle of −15° with respect to the first collar segment, a distance between furthest extents of the outwardly extending tabs is less than the inner diameter.

12. A method of forming a foldable mounting collar, comprising:
providing first and second collar segments, wherein each collar segment includes:
a planar annular segment that substantially subtends a semicircle; and
a collar flange that, when the planar annular segment is horizontal, extends vertically downward along an inner periphery of the planar annular segment, such that the collar flange forms a cylindrical portion; and
a clamp having a portion that extends below the collar flange;
the method further comprising pivotably coupling the first and second collar segments, such that:
the second collar segment can rotate, relative to the first collar segment, through at least a polar angle range sufficient for the foldable mounting collar to fit through an aperture having a diameter defined by the cylindrical portions of the collar flanges when both annular segments are horizontal; and
the second collar segment can rotate, relative to the first collar segment, through a negative polar angle that is sufficient to limit the portions of the clamps that extend beneath the collar flanges to a horizontal dimension that is less than the diameter.

13. The method of claim 12, wherein:
providing the first and second collar segments comprises arranging the collar flanges so that they do not interfere with one another when the second collar segment rotates, relative to the first collar segment, through the negative polar angle; and
pivotably coupling the first and second collar segments comprises:
coupling a first end of the first collar segment to a first end of the second collar segment, so as to define a first pivot point; and
coupling a second end of the first collar segment to a second end of the second collar segment, so as to define a second pivot point, so that a rotational axis forms at a line passing through the first and second pivot points.

14. A method of forming a foldable mounting collar, comprising:
providing first and second collar segments, wherein each collar segment includes:
a planar annular segment that substantially subtends a semicircle, and
a collar flange that, when the planar annular segment is horizontal, extends vertically downward along an inner periphery of the planar annular segment, such that the collar flange forms a cylindrical portion;
wherein providing each of the first and second collar segments comprises:
stamping sheet metal to provide a contiguous metal blank that is substantially planar and defines a first plane, wherein metal corresponding to the planar annular segment is in the first plane;
bending a first portion of the metal blank downward relative to the first plane, to form the collar flange; and
bending second and third portions of the metal blank upward relative to the first plane, to form hinge flanges;
the method further comprising:
pivotably coupling the first and second collar segments, such that the second collar segment can rotate, relative to the first collar segment, through at least a polar angle range sufficient for the foldable mounting collar to fit through an aperture having a diameter defined by the cylindrical portions of the collar flanges when both annular segments are horizontal.

15. The method of claim 14, wherein stamping the contiguous metal blank comprises stamping the contiguous metal blank with a fourth portion of the contiguous metal blank; and further comprising:
bending the fourth portion of the contiguous metal blank upward relative to the first plane to form a tab;
forming a clamp aperture in the tab; and
threading an inner face of the clamp aperture to accept a screw of a clamp.

16. The method of claim 15, further comprising:
providing a slider, having a length and forming:
a slider aperture, sized to accept the screw, near a first end of the length, and
a tab at a second end of the length;
the method further comprising:
inserting the screw through the slider aperture; and
threading the screw into the clamp aperture.

17. A method of installing a foldable mounting collar, comprising:
(a) folding first and second collar segments of the foldable mounting collar together to minimize size of the foldable mounting collar;
(b) inserting the foldable mounting collar through an aperture formed in a mounting surface;
(c) unfolding the first and second collar segments; and
(d) seating the first and second collar segments with respect to the aperture such that:
an annular segment of each of the first and second collar segments is disposed adjacent to a distal planar surface of the mounting surface; and a collar flange of each of the first and second collar segments is disposed within an inner edge of the aperture.

18. A method of installing a foldable mounting collar, comprising:
    (a) folding first and second collar segments of the foldable mounting collar together to minimize size of the foldable mounting collar;
    (b) inserting the foldable mounting collar through an aperture formed in a mounting surface;
    (c) unfolding the first and second collar segments, and, after unfolding the first and second collar segments:
        unfolding the first and second collar segments such that the second collar segment is disposed at a negative polar angle with respect to the first collar segment; and
        extending clamps of the first and second collar segments back through the aperture to a proximal side of the mounting surface;
    the method further comprising:
    (d) seating the first and second collar segments with respect to the aperture such that:
        an annular segment of each of the first and second collar segments is disposed adjacent to a distal planar surface of the mounting surface; and
        a collar flange of each of the first and second collar segments is disposed adjacent to an inner edge of the aperture.

19. The method of claim 18, further comprising, after seating the first and second collar segments with respect to the aperture:
    adjusting at least one of the clamps so as to engage the mounting surface with the at least one of the clamps, such that an attachment feature of the clamp, and the collar segment to which the clamp is attached, grip the mounting surface therebetween.

20. The method of claim 19, wherein adjusting at least one of the clamps comprises inserting a tool through the aperture to operate a screw that forms part of the at least one of the clamps, the screw being located on a distal side of the mounting surface while a user of the tool is on a proximal side of the mounting surface.

21. A foldable mounting collar, comprising:
    first and second collar segments, wherein each collar segment includes:
        a planar annular segment that substantially subtends a semicircle, and
        a collar flange that, when the planar annular segment is horizontal, extends vertically downward along an inner periphery of the planar annular segment, such that the collar flange forms a cylindrical portion; and
    the foldable mounting collar further comprises pivot means that hingedly couple the first and second collar segments; and
    wherein the second collar segment can rotate, relative to the first collar segment, through at least a polar angle range sufficient for the foldable mounting collar to fit through an aperture having a diameter defined by the cylindrical portions of the collar flanges when both collar segments are horizontal, the polar angle range being at least positive 60° through −5°.

22. The foldable mounting collar of claim 21, wherein the polar angle range is at least positive 135° through −15°.

23. The foldable mounting collar of claim 21, wherein the collar segments do not interfere with one another as the second collar segment rotates throughout the polar angle range.

24. A foldable mounting collar, comprising:
    first and second collar segments, wherein each collar segment includes:
        a planar annular segment that substantially subtends a semicircle,
        a collar flange that, when the planar annular segment is horizontal, extends vertically downward along an inner periphery of the planar annular segment, such that the collar flange forms a cylindrical portion, and
        a clamp, attached to the planar annular segment, for securing the foldable mounting collar to a cut edge of a wall or ceiling material; and
    the foldable mounting collar further comprises pivot means that hingedly couple the first and second collar segments;
    and wherein:
    the second collar segment can rotate, relative to the first collar segment using the pivot means, through at least a polar angle range sufficient for the foldable mounting collar to fit through an aperture having a diameter defined by the cylindrical portions of the collar flanges when both collar segments are horizontal; and
    each of the clamps has an attachment feature that extends below the collar flange, and is operable to grip the wall or ceiling material between the attachment feature and the planar annular segment to which the clamp is attached.

25. A foldable mounting collar operable for installation on a distal surface of a mounting surface, comprising:
    first and second collar segments, wherein each collar segment includes:
        a planar annular segment that substantially subtends a semicircle,
        a collar flange that, when the planar annular segment is horizontal, extends vertically downward along an inner periphery of the planar annular segment, such that the collar flange forms a cylindrical portion, and
        a clamp, attached to the planar annular segment, for securing the foldable mounting collar to a cut edge of the mounting surface; and
    the foldable mounting collar further comprises pivot means that hingedly couple the first and second collar segments;
    and wherein:
    the second collar segment can rotate, relative to the first collar segment using the pivot means, through at least a polar angle range sufficient for the foldable mounting collar to fit through a circular aperture in the mounting surface having a diameter defined by the cylindrical portions of the collar flanges when both collar segments are horizontal, such that the foldable mounting collar can be passed by an installer, through the aperture, from a proximal side of the mounting surface to a distal side of the mounting surface; and
    each of the clamps is operable by a tool that can be inserted through the aperture to the distal side of the mounting surface, while the installer remains on the proximal side of the mounting surface.

* * * * *